United States Patent
O'Connell et al.

(10) Patent No.: US 9,998,537 B1
(45) Date of Patent: *Jun. 12, 2018

(54) HOST-SIDE TRACKING OF DATA BLOCK CHANGES FOR INCREMENTAL BACKUP

(71) Applicant: EMC Corporation, Hopkinton, MA (US)

(72) Inventors: Mark A. O'Connell, Westborough, MA (US); Helen S. Raizen, Jamaica Plain, MA (US); Brad Bowlin, Fort Collins, CO (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 142 days.

This patent is subject to a terminal disclaimer.

(21) Appl. No.: 14/673,998

(22) Filed: Mar. 31, 2015

(51) Int. Cl.
*G06F 15/16* (2006.01)
*H04L 29/08* (2006.01)
*H04L 29/06* (2006.01)

(52) U.S. Cl.
CPC .......... *H04L 67/1095* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 6,385,706 B1 | 5/2002 | Ofek et al. | |
| 7,603,533 B1 | 10/2009 | Tsypliaev et al. | |
| 7,953,948 B1 | 5/2011 | Dyatlov et al. | |
| 8,010,495 B1 | 8/2011 | Kuznetzov et al. | |
| 8,108,640 B1 | 1/2012 | Holl, II | |
| 8,370,301 B1 | 2/2013 | Chen | |
| 9,171,002 B1 * | 10/2015 | Mam | G06F 17/30091 |
| 9,424,137 B1 | 8/2016 | Mam | |
| 2002/0079221 A1 * | 6/2002 | Dolphin | G01N 27/44747 204/451 |
| 2003/0061399 A1 | 3/2003 | Wagener et al. | |
| 2005/0015685 A1 | 1/2005 | Yamamoto | |
| 2005/0125609 A1 | 6/2005 | Satoyama et al. | |
| 2006/0015696 A1 | 1/2006 | Nguyen et al. | |

(Continued)

OTHER PUBLICATIONS

Response to U.S. Non-Final Office Action dated May 19, 2017 for U.S. Appl. No. 14/674,308; Response filed on Aug. 14, 2017; 12 Pages.

(Continued)

*Primary Examiner* — Younes Naji
(74) *Attorney, Agent, or Firm* — Daly, Crowley, Mofford & Durkee, LLP (57) ABSTRACT

In one aspect, a method includes configuring a kernel driver to record data block changes of a logical unit in a bit map and using the bitmap to perform an incremental backup of the logical unit. In another aspect, an apparatus includes electronic hardware circuitry configured to configure a kernel driver to record data block changes of a logical unit in a bit map and use the bitmap to perform an incremental backup of the logical unit. In a further aspect, an article includes a non-transitory computer-readable medium that stores computer-executable instructions. The instructions cause a machine to configure a kernel driver to record data block changes of a logical unit in a bit map and use the bitmap to perform an incremental backup of the logical unit.

10 Claims, 8 Drawing Sheets

(56) References Cited

U.S. PATENT DOCUMENTS

| | | |
|---|---|---|
| 2007/0088767 A1 | 4/2007 | Passerini et al. |
| 2007/0220309 A1 | 9/2007 | Andre et al. |
| 2008/0301663 A1* | 12/2008 | Bahat .................. G06F 8/656 717/170 |
| 2009/0006792 A1 | 1/2009 | Federwisch et al. |
| 2010/0023716 A1* | 1/2010 | Nemoto ............. G06F 11/1451 711/162 |
| 2010/0076934 A1 | 3/2010 | Pershin et al. |
| 2010/0077165 A1 | 3/2010 | Lu et al. |
| 2011/0231698 A1* | 9/2011 | Zlati ................. G06F 11/3006 714/3 |
| 2012/0079221 A1* | 3/2012 | Sivasubramanian G06F 11/1456 711/162 |
| 2013/0238562 A1* | 9/2013 | Kumarasamy .... G06F 17/30088 707/649 |
| 2014/0108351 A1* | 4/2014 | Nallathambi ..... G06F 17/30088 707/639 |
| 2016/0147607 A1* | 5/2016 | Dornemann ........ G06F 11/1435 711/162 |

OTHER PUBLICATIONS

U.S. Non-Final Office Action dated May 19, 2017 for U.S. Appl. No. 14/674,308; 14 Pages.

U.S. Appl. No. 14/674,308, filed Mar. 31, 2015, O'Connell et al.

U.S. Final Office Action dated Nov. 16, 2017 for U.S. Appl. No. 14/674,308; 18 Pages.

Response to U.S. Final Office Action dated Nov. 16, 2017 U.S. Appl. No. 14/674,308; Response filed on Feb. 14, 2018; 10 Pages.

\* cited by examiner

HOST-SIDE TRACKING OF DATA BLOCK CHANGES FOR INCREMENTAL BACKUP

BACKGROUND

Computer data is vital to today's organizations and a significant part of protection against disasters is focused on data protection. As solid-state memory has advanced to the point where cost of storage has become a relatively insignificant factor, organizations can afford to operate with systems that store and process terabytes of data.

Conventional data protection systems include tape backup drives, for storing organizational production site data on a periodic basis. Another conventional data protection system uses data replication, by creating a copy of production site data of an organization on a secondary backup storage system, and updating the backup with changes. The backup storage system may be situated in the same physical location as the production storage system, or in a physically remote location. Data replication systems generally operate either at the application level, at the file system level, or at the data block level.

SUMMARY

In one aspect, a method includes configuring a kernel driver to record data block changes of a logical unit in a bit map and using the bitmap to perform an incremental backup of the logical unit. In another aspect, an apparatus includes electronic hardware circuitry configured to configure a kernel driver to record data block changes of a logical unit in a bit map and use the bitmap to perform an incremental backup of the logical unit. In a further aspect, an article includes a non-transitory computer-readable medium that stores computer-executable instructions. The instructions cause a machine to configure a kernel driver to record data block changes of a logical unit in a bit map and use the bitmap to perform an incremental backup of the logical unit.

DETAILED DESCRIPTION

Described herein are techniques to perform host-side tracking of data blocks for incremental backup. In one example, these techniques may be applied to multi-host configurations where a logical unit is shared by multiple hosts. Using these techniques, no special support from a block storage system is required (beyond the ability to take snapshots). Tracking changed blocks for shared LUNs has very limited overhead, with no cross-host synchronization required in the normal block I/O path.

Figure 1A:
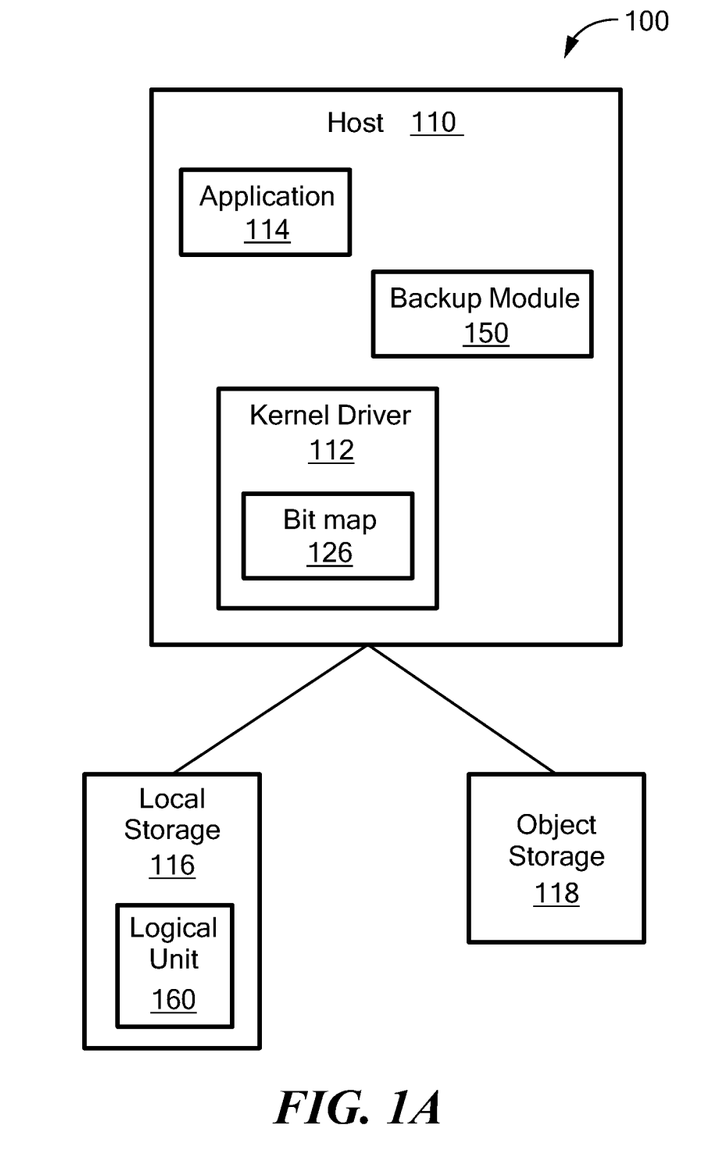
FIG. 1A is a block diagram of an example of a data protection system with attached storage.

Referring to FIG. 1A, a data protection system 100 includes a host 110 running an application 114, a local storage 116 and an object storage 118. The application 114 writes and reads to a logical unit 160 stored on the local storage 116. The host 110 includes a kernel driver 112 and a backup module 150 used to backup the logical unit 160 to the object storage 118. The kernel driver 112 records which blocks of logical unit 160 have been changed in a bit map 126. The bit-map 126 is used to record whether a block or a multiple of blocks changed or not. For example, if a block of data changed a "1" is stored in the bit map for that block of data. In one example, a data block may be 4 kb or 8 kb. In another example, a data block is any size designated by a user.

Figure 1B:
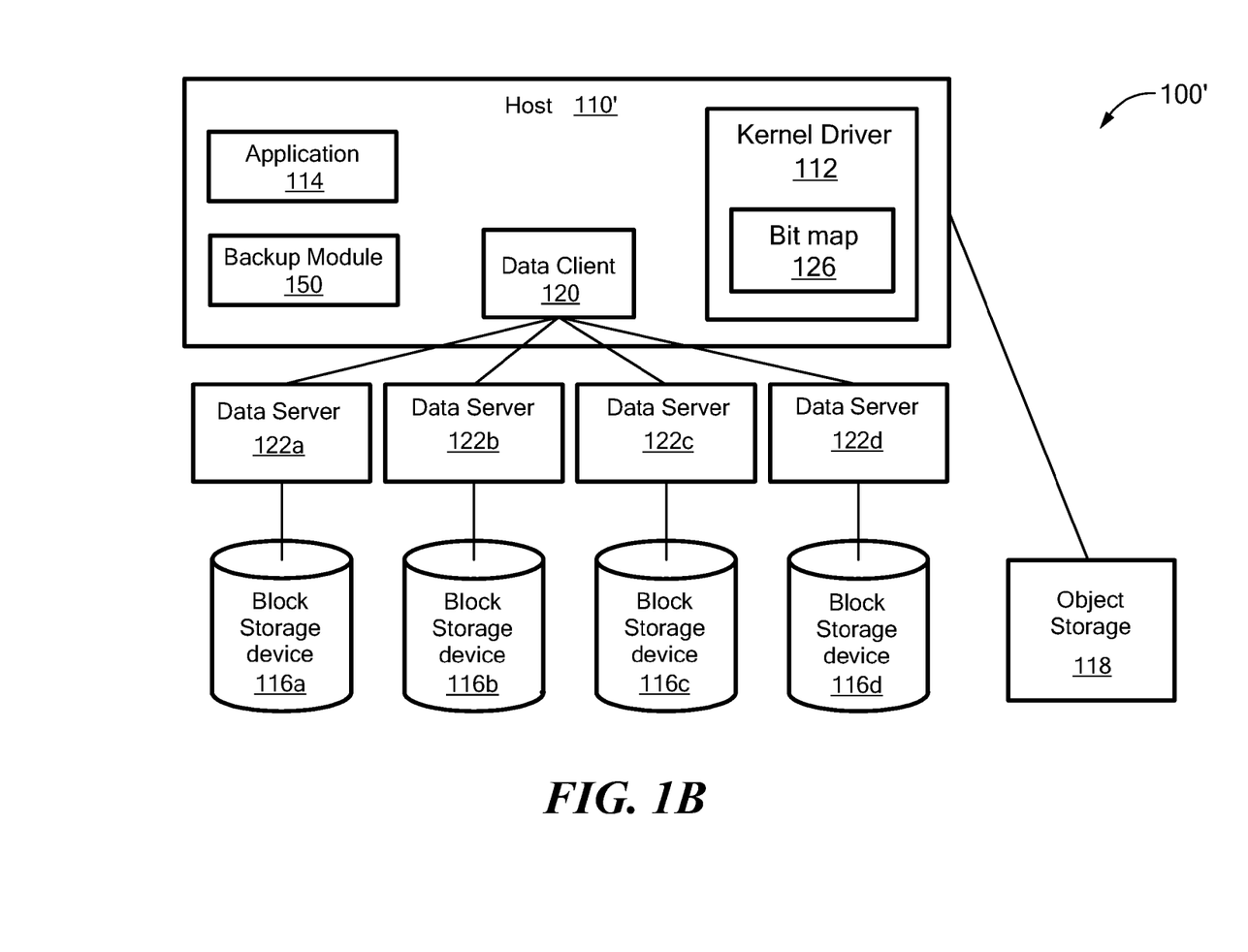
FIG. 1B is a block diagram of another example of a data protection system with distributed storage.

Referring to FIG. 1B, the techniques described herein may be applied to other data protection systems and are not limited, for example, to the data protection system 100 that included attached storage. For example, a data protection system 100' that includes distributed storage may be used in conjunction with the techniques described herein. The system 100' includes a host 110' and data servers 122a-122d each with a block storage device 116a-116d, respectively. The host 110' is the same as host 110 but further includes a data client 120 to access data to the data servers 122a-122d for storage.

Figure 2:
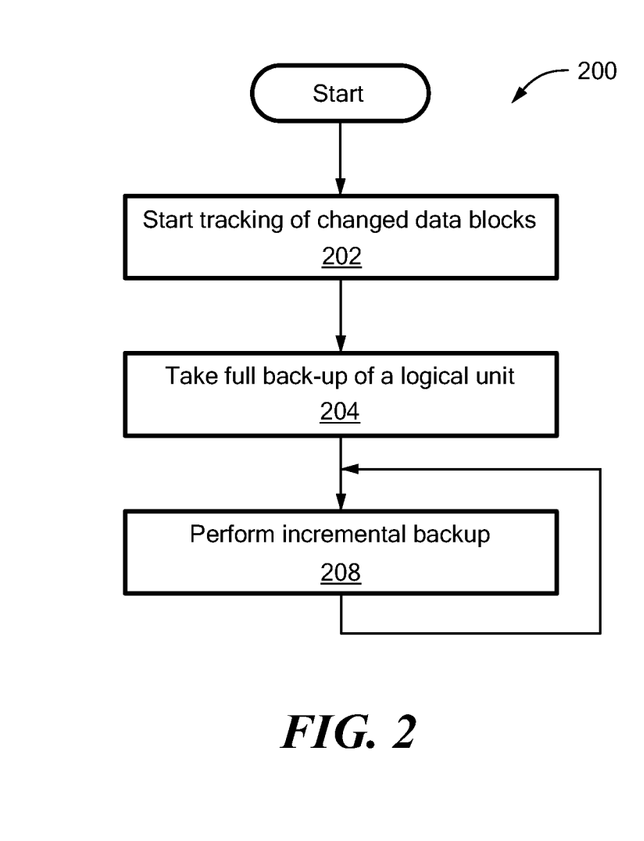
FIG. 2 is a flowchart of an example of a process to initiate incremental backup.

Referring to FIG. 2, a process 200 is an example of a process to initiate incremental backups. Process 200 starts tracking of changed data blocks (202). For example, a user initiates the tracking of changed data blocks. If there is no prior full or incremental backup, then process 200 takes a full back-up of the logical unit 160 (204). Process 200 performs an incremental backup (208) and performs successive incremental backups.

Figure 3:
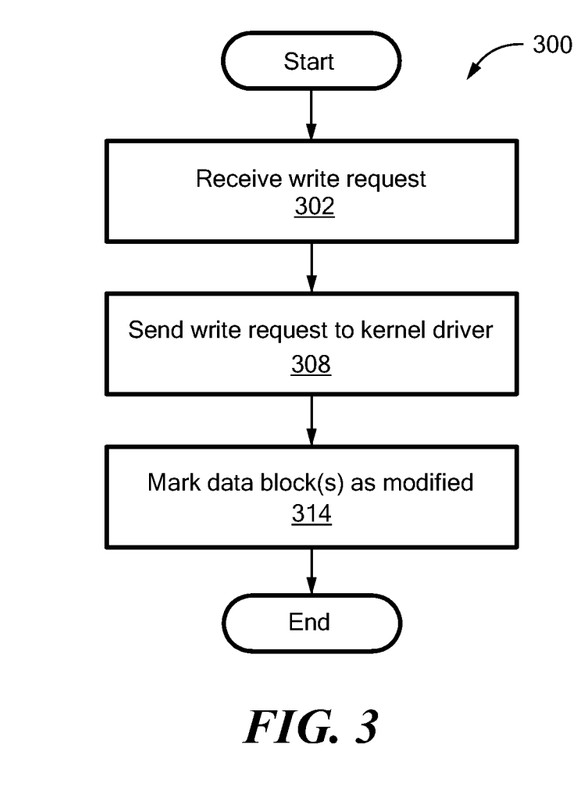
FIG. 3 is a flowchart of an example of a process to handle a write request.

Referring to FIG. 3, a process 300 is an example of a process to handle a write request. Process 300 receives a write request (302) and sends the write request to the kernel driver (308). For example, the application 114 sends a write request to write to the logical unit 160. The application 114 sends the write request to the kernel driver 112. Process 300 marks data block(s) as modified (314). For example, after being enabled (see for example processing block 202), the kernel driver 112 marks the bit indicating the change for every data block written by the write request and the data is written to the logical unit 160.

Figure 4:
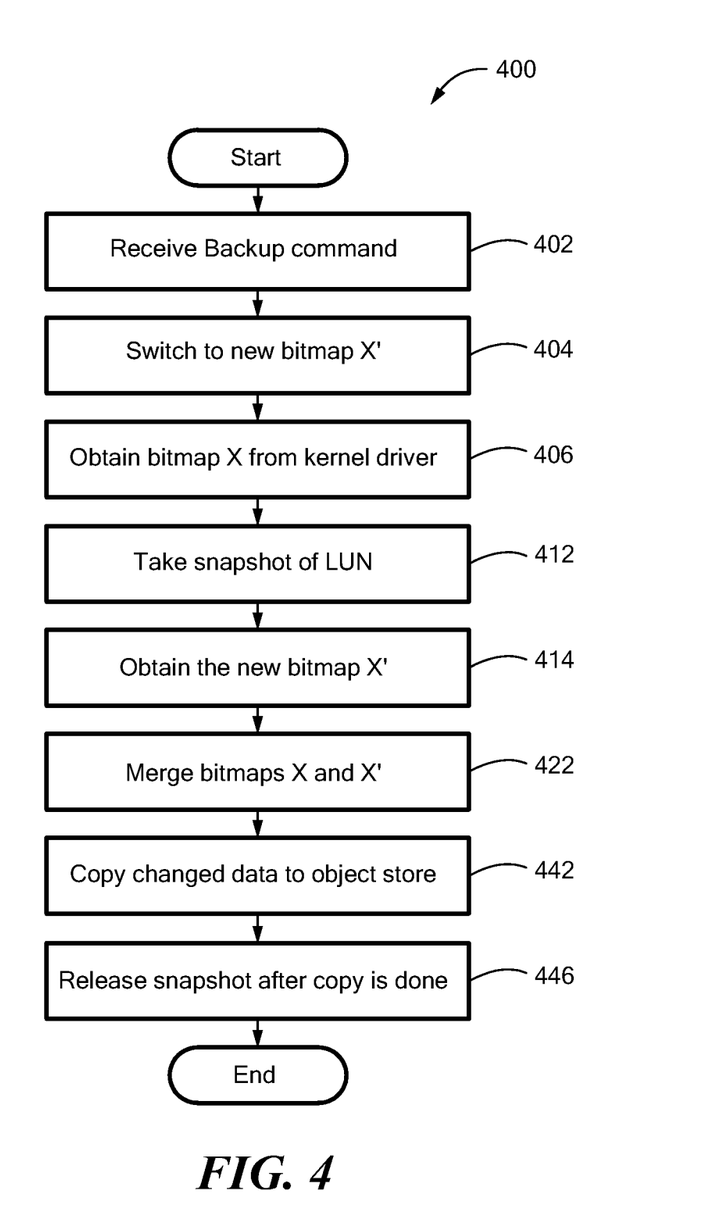
FIG. 4 is a flowchart of an example of a process to perform a backup.

Referring to FIG. 4, a process 400 is an example of a process to perform an incremental backup. Process 400 receives a backup command (402). For example, a command is received by the backup module 150 received to backup a logical unit 160.

Process 400 switches to a new bitmap (404). For example, a command is issued to the kernel driver 112 to start a new bit map X'. Processing block 404 is atomic with respect to any application writes Process 400 obtains bit map from the kernel driver (406). For example, the backup module 150 obtains the bit map 126 from the kernel driver 112. In one particular example, processing blocks 404 and 406 are performed simultaneously.

Process 400 takes a snapshot of the logical unit (412). For example, the backup module 150 takes or causes to be taken a snapshot of the logical unit 160 and placed on the local storage 116.

Process 400 obtains the new bitmap (414) and merges the previous bit map with the new bit map (422). For example, the bitmap X and a new bitmap X' are merged together to form a single bitmap using a logical "or" function.

Process 400 copies the changed data blocks to the object store (432). For example, the backup module 150 uses the combined bitmap 422 to identify which portions of the snapshot hold changed data and copies that data to the object store 118.

Process 400 releases the snapshot after the copy is done (436). For example, the backup module 150 releases the snapshot taken in processing block 412 to be, for example, erased after processing block 432 has completed or the storage consumed by the snapshot is freed so it can be used for other purposes.

Figure 5:
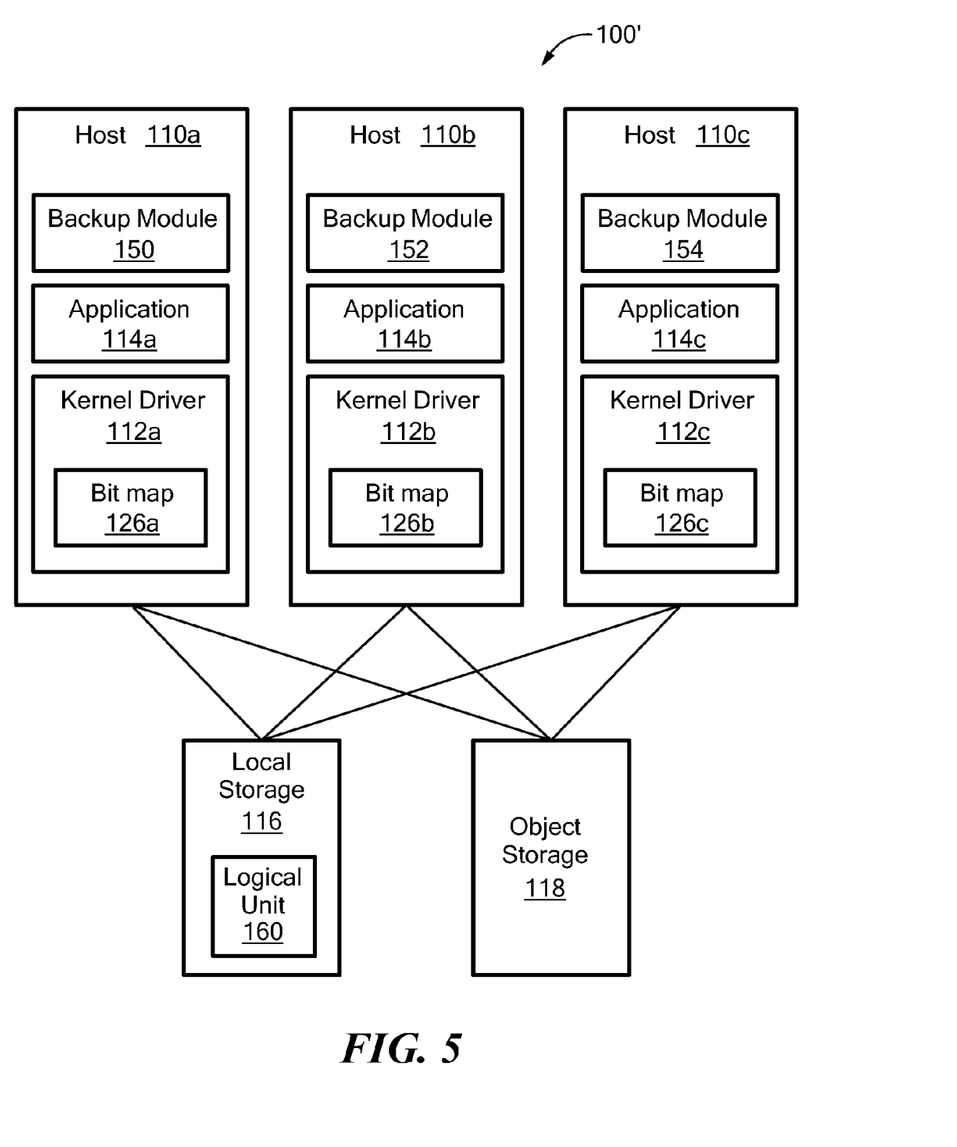
FIG. 5 is a block diagram of another example of a data protection system with multiple hosts and a shared logical unit.

Referring to FIG. 5, another example of a data protection system is a data protection system 100'. The data protection system 100' includes three hosts (e.g., a host 110*a*, a host 110*b*, and a host 110*c*). The host 110*a* includes the backup module 150, an application 114*a* and a kernel driver 112*a*. The host 110*b* includes an application 114*b*, a backup module 152 and a kernel driver 112*b* and the host 110*c* includes an application 114*c*, a backup module 154 and a kernel driver 112*c*. In this configuration each of the hosts 110*a*-110*c* share access to the logical unit 160 (sometimes referred to as a shared LUN or shared logical unit). As will be further explained herein, the backup module 150 may also be used to backup the logical unit 160 to the object storage 118 even when the logical unit 160 is being shared by the hosts 110*a*-110*c* using the bit maps 126*a*-126*c* in the kernels 112*a*-112*d*.

Figure 6:
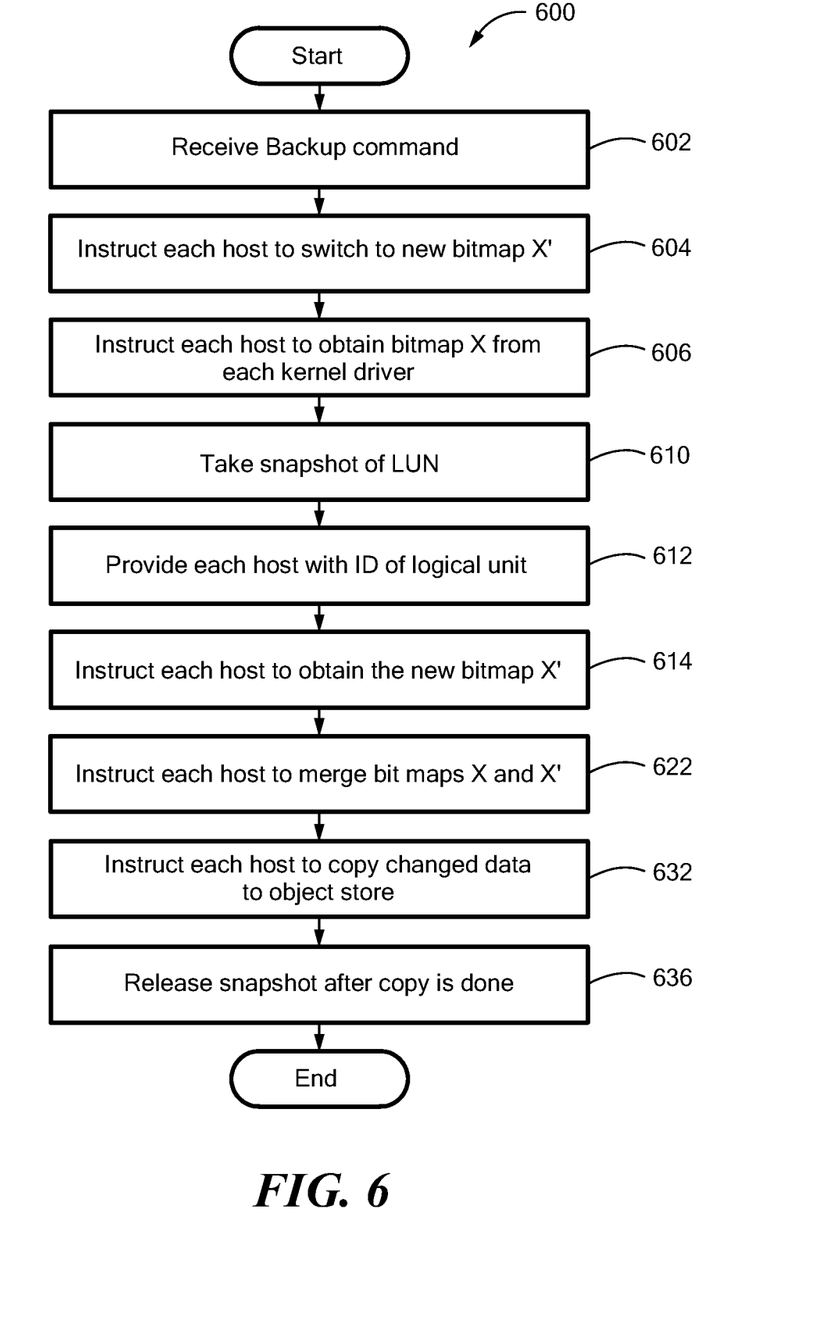
FIG. 6 is a flowchart of an example of a process to perform a backup on a shared logical unit.

Referring to FIG. 6, a process 600 is an example to incrementally backup a shared logical unit. Process 600 receives a backup command (602). For example, a command is received to backup a logical unit 160 by the backup module 150.

Process 600 instructs each host to switch to a new bitmap for each kernel driver (604). For example, each of the kernel drivers 112*a*-112*c* are instructed to start a new bit map X'. Processing block 604 occurs between application writes.

Process 600 instructs each host to obtain a bit map, X (606). For example, each of the kernel drivers 112*a*-112*c* are instructed to obtain their respective bit map 126*a*-126*c*. In one example, processing blocks 604 and 606 are performed simultaneously.

Process 600 takes a snapshot of the logical unit (610). For example, the backup module 150 takes or causes to be taken a snapshot of the logical unit 160 to the object block storage after processing blocks 604 and 606 have completed.

Process 600 provides the ID of the snapshot to each of the hosts (612). For example, the backup module 150 sends the ID of the snapshot of the logical unit to each of the backup modules 152, 154.

Process 600 instructs each host to: obtain the new bitmap (614) and merge the previous bit map with the new bit map (622). For example, each of the backup modules 150, 152, 154 are instructed (e.g., by a user component) to get their respective new bit map X' and merge the previous bitmap X with the new bitmap X' to form a merged bitmap using a logical "or" function.

Process 600 instructs each host to copy the changed data to the object store (632). For example, each of the backup modules 150, 152, 154 uses their respective merged bitmap to identify the data that has changed and to the copy the changed data from the snapshot taken in processing block 612 to the object store 118.

Process 600 releases the snapshot after the copy is done (636). For example, the backup module 150 releases the snapshot taken in processing block 612 to be, for example, erased after processing block 632 has completed.

Figure 7:
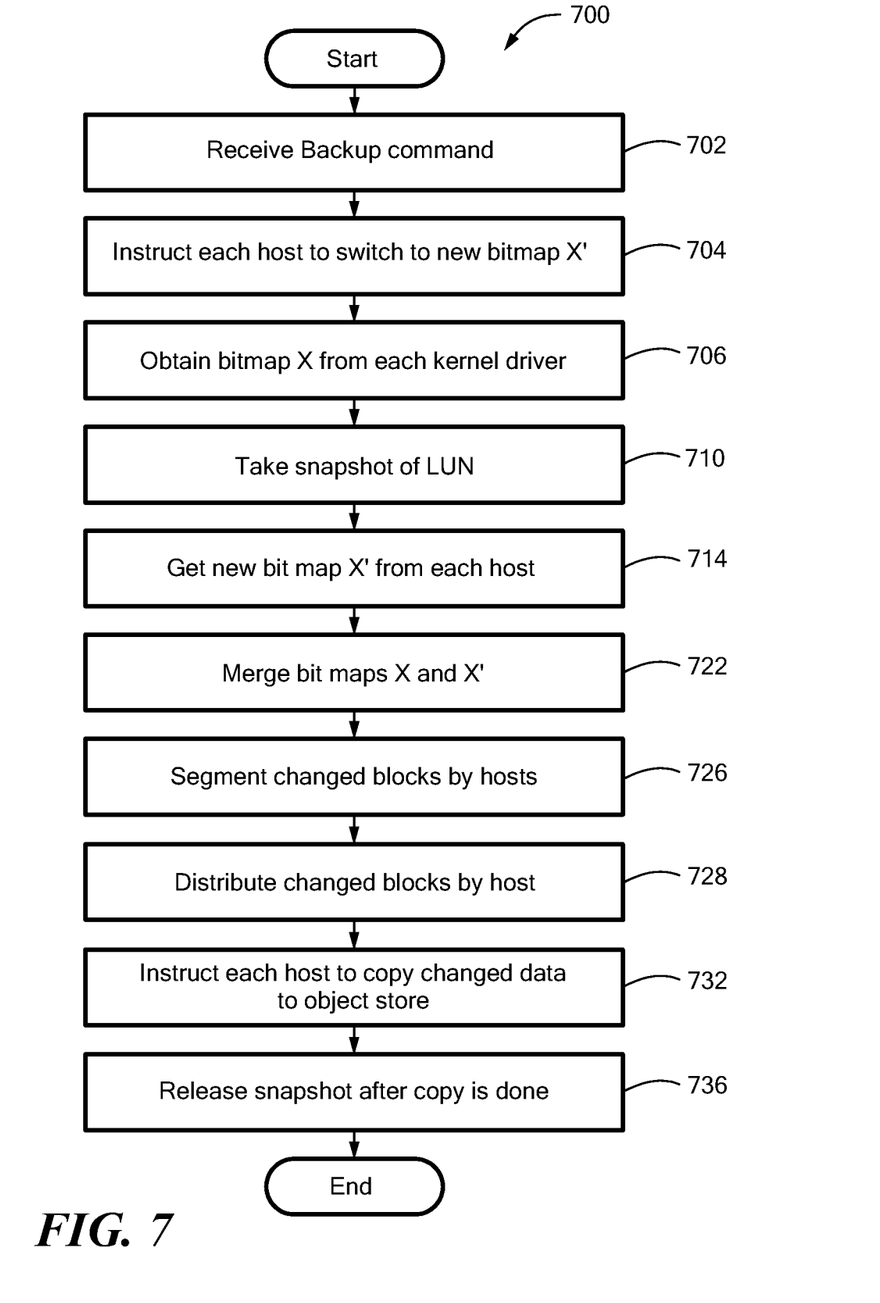
FIG. 7 is a flowchart of another example of a process to perform a backup on a shared logical unit.

Referring to FIG. 7, a process 700 is another example to incrementally backup a shared logical unit. Process 700 receives a backup command (702). For example, a command is received to backup a logical unit 160.

Process 700 instruct each host to switch to a new bitmap, X' (704). For example, a command is issued to the kernel driver 112*a*-112*c* to start a new bit map.

Process 700 obtains a bit map X from each kernel driver (706). For example, the backup module 150 obtains the bit maps 126*a*-126*c* from the kernel drivers 112*a*-112*c*.

Processing blocks 704 and 706 are either performed simultaneously, or the new bit map is started before the old bit map is retrieved. Starting the new bitmap must be synchronized so that no writes are lost.

Process 700 takes a snapshot of the logical unit (712). For example, the backup module 150 takes or causes to be taken a snapshot of the logical unit 160 on the storage 116 after processing blocks 704 and 706 have completed.

Process 700 obtains the new bitmap from each host (714) and merges the previous bit map with the new bit map (722). For example, the bitmap X and a new bitmap X' are merged together to form a single bitmap using a logical "or" function.

Process 700 segments changed block by host (726) and distributes change blocks by host (728). For example, each host 110*a*-110*c* will receive a section of the bitmap which indicates a partial set of the data blocks that have changed.

Process 700 instructs each host to use the bitmap section it was sent to identify a set of blocks which have changed, to read those blocks from the snapshot, and to copy them to the object store (732). For example, each of the backup modules 150, 152, 154 copies the data that changed to the object store 118.

Process 700 releases the snapshot after the copy is done (736). For example, the backup module 150 releases the snapshot taken in processing block 712 to be, for example, erased after processing block 732 has completed.

Figure 8:
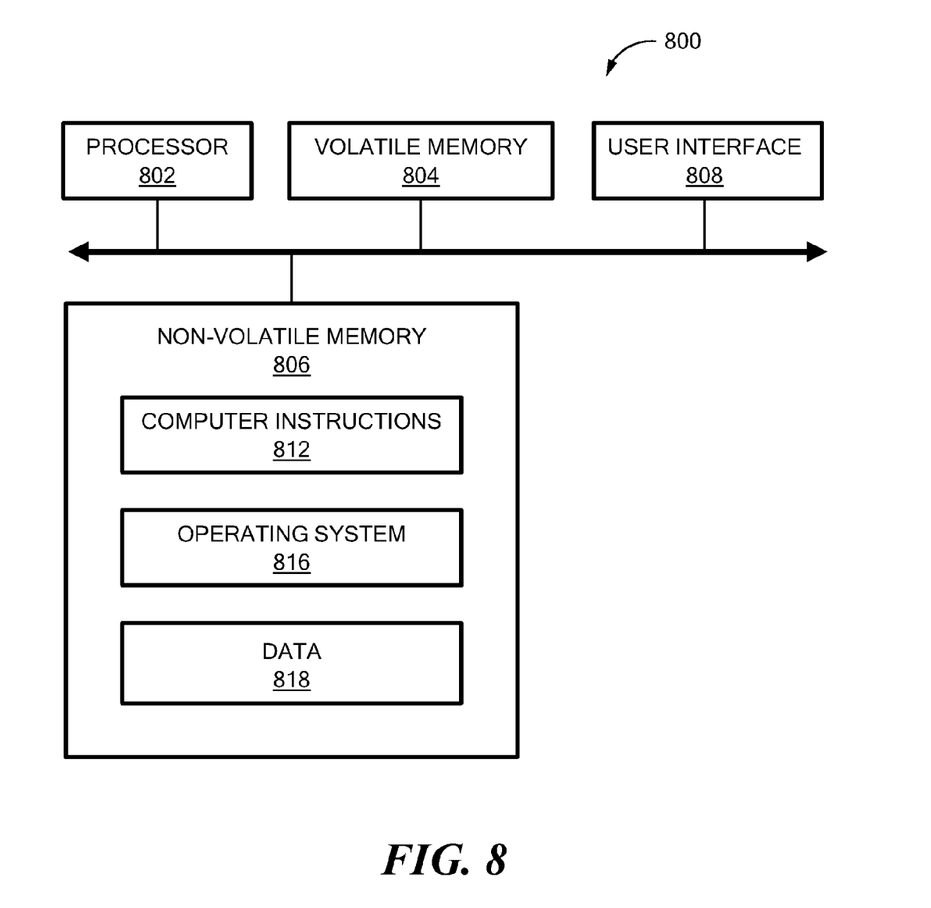
FIG. 8 is a computer on which any of the portions of the processes of FIGS. 2, 3, 4, 6 and 7 may be implemented.

Referring to FIG. 8, an example of the backup module 150 is a backup module 150'. The backup module 150' includes a processor 802, a volatile memory 804, a non-volatile memory 806 (e.g., hard disk) and the user interface (UI) 808 (e.g., a graphical user interface, a mouse, a keyboard, a display, touch screen and so forth). The non-volatile memory 806 stores computer instructions 812, an operating system 816 and data 818. In one example, the computer instructions 812 are executed by the processor 802 out of volatile memory 804 to perform all or part of the processes described herein (e.g., processes 200, 300, 400, 600 and 700).

The processes described herein (e.g., processes 200, 300, 400, 600 and 700) are not limited to use with the hardware and software of FIG. 8; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/ machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes 200, 300, 400, 600 and 700 are not limited to the specific processing order of FIGS. 2, 3, 4, 6 and 7, respectively. Rather, any of the processing blocks of FIGS. 2, 3, 4, 6 and 7 may be re-ordered, combined or removed, performed in parallel or in serial, as necessary, to achieve the results set forth above.

The processing blocks (for example, in the processes 200, 300, 400, 600 and 700) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method, comprising:
receiving a first write request for a first application on a first host having a first kernel driver which updates a first bitmap for the first host in response to the first write request, wherein the first bit map is updated to reflect block changes in a logical unit for the first write request;
receiving a second write request for a second application on a second host having a second kernel driver which updates a second bitmap for the second host in response to the second write request, wherein the second bit map is updated to reflect block changes in the logical unit for the second write request, wherein the logical unit is shared by the first and second hosts;
receiving an incremental backup command to backup the logical unit;
starting a first new bitmap for the first host after receiving the incremental backup command;
starting a second new bitmap for the second host after receiving the incremental backup command;
taking a snapshot of the logical unit;
merging, by the first host, the first bitmap and the first new bitmap to generate a first merged bitmap indicating changes to the logical unit associated with the snapshot;
merging, by the second host, the second bitmap and the second new bitmap to form a second merged bitmap indicating changes to the logical unit associated with the snapshot;
copying, by the first host, changed data blocks of the logical unit to object storage based upon the first merged bitmap;
copying, by the second host, changed data blocks of the logical unit to the object storage based upon the second merged bitmap; and
releasing the snapshot.

2. The method according to claim 1, further including sending an ID of the snapshot to the logical unit.

3. The method according to claim 1, further including merging the first bitmap and the first new bitmap using a logical OR.

4. The method according to claim 1, wherein the first host includes a data client coupled to data servers for accessing block storage devices providing the logical unit.

5. A article, comprising:
instructions stored on a non-transitory computer readable medium that enable a machine to:
receive a first write request for a first application on a first host having a first kernel driver which updates a first bitmap for the first host in response to the first write request, wherein the first bit map is updated to reflect block changes in a logical unit for the first write request;
receive a second write request for a second application on a second host having a second kernel driver which updates a second bitmap for the second host in response to the second write request, wherein the second bit map is updated to reflect block changes in the logical unit for the second write request, wherein the logical unit is shared by the first and second hosts;
receive an incremental backup command to backup the logical unit;
start a first new bitmap for the first host after receiving the incremental backup command;
start a second new bitmap for the second host after receiving the incremental backup command;
take a snapshot of the logical unit;
merge, by the first host, the first bitmap and the first new bitmap to generate a first merged bitmap indicating changes to the logical unit associated with the snapshot;

merge, by the second host, the second bitmap and the second new bitmap to form a second merged bitmap indicating changes to the logical unit associated with the snapshot;

copy, by the first host, changed data blocks of the logical unit to object storage based upon the first merged bitmap; and copy, by the second host, changed data blocks of the logical unit to the object storage based upon the second merged bitmap; and release the snapshot.

6. The article according to claim 5, further including instructions for sending an ID of the snapshot to the logical unit.

7. The article according to claim 5, further including merging the first bitmap and the first new bitmap using a logical OR.

8. A system, comprising:

at least one processor and memory configured to:

receive a first write request for a first application on a first host having a first kernel driver which updates a first bitmap for the first host in response to the first write request, wherein the first bit map is updated to reflect block changes in a logical unit for the first write request;

receive a second write request for a second application on a second host having a second kernel driver which updates a second bitmap for the second host in response to the second write request, wherein the second bit map is updated to reflect block changes in the logical unit for the second write request, wherein the logical unit is shared by the first and second hosts;

receive an incremental backup command to backup the logical unit;

start a first new bitmap for the first host after receiving the incremental backup command;

start a second new bitmap for the second host after receiving the incremental backup command;

take a snapshot of the logical unit;

merge, by the first host, the first bitmap and the first new bitmap to generate a first merged bitmap indicating changes to the logical unit associated with the snapshot;

merge, by the second host, the second bitmap and the second new bitmap to form a second merged bitmap indicating changes to the logical unit associated with the snapshot;

copy, by the first host, changed data blocks of the logical unit to object storage based upon the first merged bitmap;

copy, by the second host, changed data blocks of the logical unit to the object storage based upon the second merged bitmap; and release the snapshot.

9. The system according to claim 8, wherein the system is further configured to send an ID of the snapshot to the logical unit.

10. The system according to claim 8, wherein the system is further configured to merge the first bitmap and the first new bitmap using a logical OR.

* * * * *